US012594946B2

(12) United States Patent
Kim

(10) Patent No.: US 12,594,946 B2
(45) Date of Patent: Apr. 7, 2026

(54) DRIVER ASSISTANCE APPARATUS AND DRIVER ASSISTANCE METHOD

(71) Applicant: HL KLEMOVE CORP., Incheon (KR)

(72) Inventor: Hyunbeom Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 187 days.

(21) Appl. No.: 18/241,227

(22) Filed: Aug. 31, 2023

(65) Prior Publication Data

US 2024/0182052 A1     Jun. 6, 2024

(30) Foreign Application Priority Data

Dec. 2, 2022     (KR) ......................... 10-2022-0166902

(51) Int. Cl.
B60W 50/08          (2020.01)
B60W 30/095        (2012.01)
(Continued)

(52) U.S. Cl.
CPC ...... B60W 50/087 (2013.01); B60W 30/0956 (2013.01); B60W 50/14 (2013.01);
(Continued)

(58) Field of Classification Search
CPC ........... B60W 50/087; B60W 30/0956; B60W 50/14; B60W 2420/403; B60W 2420/408;
(Continued)

(56) References Cited

U.S. PATENT DOCUMENTS 11,269,326 B2 *   3/2022   Blumer ................. G05D 1/0061
2008/0309468 A1 *  12/2008  Greene ................... G08G 1/166
                                                          340/436

(Continued)

FOREIGN PATENT DOCUMENTS

| | | |
|---|---|---|
| JP | 2020-164075 | 10/2020 |
| KR | 10-2019-0124120 | 11/2019 |
| KR | 10-2019-0124122 | 11/2019 |
| KR | 10-2019-0126258 | 11/2019 |

OTHER PUBLICATIONS

"Evaluation of Multimodal and Multi-Staged Alerting Strategies for Forward Collision Warning Systems" by J. Ma et al., Sensors 2022, 22, 1189 published Feb. 4, 2022. (Year: 2022).*

(Continued)

*Primary Examiner* — Kito R Robinson
*Assistant Examiner* — Tanya C Sienko
(74) *Attorney, Agent, or Firm* — WOMBLE BOND DICKINSON (US) LLP

(57) ABSTRACT

Disclosed herein is a driver assistance apparatus including a camera having a field of view around a vehicle and configured to acquire image data with, a radar installed in the vehicle and having a sensing area around the vehicle to acquire radar data, and a controller configured to process the image data and the radar data, wherein the controller determines whether a collision with a nearby object of the vehicle is predicted in response to processing the image data and the radar data when a traveling mode of the vehicle is an autonomous traveling mode, outputs a warning about risk of the collision when the collision with the object is predicted, and controls at least one of a steering, an acceleration, or a deceleration according to a detected driver's manipulation when detecting the driver's manipulation for at least one of the steering, the acceleration, or the deceleration after outputting the warning.

12 Claims, 10 Drawing Sheets

(51) Int. Cl.
    *B60W 50/14*           (2020.01)
    *G08G 1/16*           (2006.01)

(52) U.S. Cl.
    CPC ......... *G08G 1/16* (2013.01); *B60W 2420/403*
        (2013.01); *B60W 2420/408* (2024.01); *B60W*
        *2520/06* (2013.01); *B60W 2520/10* (2013.01);
        *B60W 2520/14* (2013.01); *B60W 2540/10*
        (2013.01); *B60W 2540/12* (2013.01); *B60W*
        *2540/18* (2013.01); *B60W 2554/4042*
        (2020.02); *B60W 2554/4043* (2020.02)

(58) Field of Classification Search
    CPC ......... B60W 2520/06; B60W 2520/10; B60W
        2520/14; B60W 2540/10; B60W 2540/12;
        B60W 2540/18; B60W 2554/4042; B60W
        2554/4043; B60W 30/08; B60W 30/09;
        B60W 30/095; B60W 2050/143; B60W
        40/04; B60W 10/04; B60W 10/18; B60W
        10/20; B60W 60/0059; B60W 2556/45;
        B60W 2710/18; B60W 2710/20; B60W
        40/02; B60W 50/0097; B60W 60/0015;
        B60W 60/0053; B60W 2720/10; G08G
                                 1/16
    See application file for complete search history.

(56) References Cited

U.S. PATENT DOCUMENTS

| | | | | |
|---|---|---|---|---|
| 2011/0071718 | A1* | 3/2011 | Norris | B60W 60/0051 |
| | | | | 701/23 |
| 2018/0208190 | A1* | 7/2018 | Regmi | B60W 30/0956 |
| 2019/0033866 | A1* | 1/2019 | Pack | G05D 1/0248 |
| 2020/0050185 | A1* | 2/2020 | Shimotsuma | B60W 30/09 |
| 2020/0086861 | A1* | 3/2020 | McGill, Jr. | G05D 1/0214 |
| 2021/0316765 | A1* | 10/2021 | Hardå | B60K 35/00 |
| 2021/0323541 | A1* | 10/2021 | Zhu | B60W 60/0059 |
| 2021/0380102 | A1* | 12/2021 | Kim | B60W 10/20 |
| 2022/0126877 | A1* | 4/2022 | Carroll | B60W 60/0053 |
| 2022/0266871 | A1* | 8/2022 | Hayashi | B60W 40/04 |
| 2022/0365530 | A1* | 11/2022 | Foster | B60W 60/0015 |
| 2023/0339472 | A1* | 10/2023 | Bell | B60W 60/0015 |
| 2023/0365131 | A1* | 11/2023 | Do | B60W 50/14 |

OTHER PUBLICATIONS

"Exploratory Investigation of Disengagements and Crashes in Autonomous Vehicles Under Mixed Traffic: An Endogenous Switching Regime Framework" Zulqarnain H. Khattak et al., IEEE Transactions on Intelligent Transportation Systems, vol. 22, No. 12, Dec. 2021 (Year: 2021).*

* cited by examiner

FIG. 4

| IDENTIFY OBJECT | → | PREDICT<br>TRAVELING PATH | → | PREDICT ENTRY INTO<br>TRAVELING PATH |

221                    231                    241

DRIVER ASSISTANCE APPARATUS AND DRIVER ASSISTANCE METHOD

CROSS-REFERENCE TO RELATED APPLICATION

This application claims the benefit of Korean Patent Application No. 10-2022-0166902, filed on Dec. 2, 2022 in the Korean Intellectual Property Office, the disclosure of which is incorporated herein by reference.

BACKGROUND

1. Field

Embodiments of the present disclosure relate to a driver assistance apparatus and a driver assistance method capable of predicting and warning risk of a collision with nearby objects during autonomous traveling of a vehicle.

2. Description of the Related Art

Vehicles are the most common transportation in modern society, and the number of people using the vehicles is increasing. Although there are advantages such as easy long-distance traveling and convenience of living with the development of a vehicle technology, a problem that road traffic conditions deteriorate and traffic congestion becomes often occurs in densely populated places such as Korea.

Recently, research on vehicles equipped with an advanced driver assist system (ADAS) for actively providing information on a vehicle condition, a driver condition, and/or a surrounding environment in order to reduce a driver's burden and enhance convenience is actively progressing.

As examples of ADASs mounted in the vehicle, there are lane departure warning (LDW), lane keeping assist (LKA), high beam assist (HBA), autonomous emergency braking (AEB), traffic sign recognition (TSR), adaptive cruise control (ACC), blind spot detection (BSD), etc.

An ADAS may collect information on a surrounding environment and process the collected information. In addition, the ADAS may recognize objects and design a path for the vehicle to travel based on a result of processing the collected information.

However, conventional ADASs have a problem that, when an unexpected situation occurs during autonomous traveling, the control authority of driving the vehicle cannot be transferred to a driver, and thus the driver is exposed to risk of a collision in the event of sudden danger.

SUMMARY

Therefore, it is an aspect of the present disclosure to provide a driver assistance apparatus and a driver assistance method for transferring the control authority of driving a vehicle to a driver when the collision possibility with an object positioned around a vehicle is predicted to warn a driver and the driver's manipulation for driving is detected.

Additional aspects of the disclosure will be set forth in part in the description which follows and, in part, will be obvious from the description, or may be learned by practice of the disclosure.

In accordance with one aspect of the present disclosure, a driver assistance apparatus includes a camera having a field of view around a vehicle installed on a vehicle to acquire image data, a radar installed on the vehicle and having a sensing area around the vehicle to acquire radar data, and a controller configured to process the image data and the radar data, wherein the controller determines whether a collision with a nearby object of the vehicle is predicted in response to processing the image data and the radar data when a traveling mode of the vehicle is an autonomous traveling mode, outputs a warning about risk of the collision when the collision with the object is predicted, and controls at least one of a steering, an acceleration, or a deceleration according to a detected driver's manipulation when detecting the driver's manipulation for at least one of the steering, the acceleration, or the deceleration after outputting the warning.

The controller may output a first warning about the risk of the collision when predicting the collision with the object within a predetermined first time.

When not detecting a driver's intervention in autonomous traveling after outputting the first warning, the controller may determine whether the collision with the object within a second time shorter than the first time is predicted.

When predicting the collision with the object within the second time, the controller may output a second warning about the risk of the collision to a driver.

When detecting the driver's manipulation for at least one of the steering, the acceleration, or the deceleration after outputting the second warning, the controller may cancel the autonomous traveling.

When not detecting the driver's intervention in the autonomous traveling after outputting the second warning, the controller may control at least one of the steering, the acceleration, or the deceleration in order to avoid the collision with the object.

The controller may identify the nearby object of the vehicle in response to the processing of the image data.

The controller may predict a dynamic of the object including a longitudinal speed or a transverse speed of the object in response to the processing of the radar data.

The controller may predict a traveling path of a host vehicle based on traveling information on the host vehicle including at least one of a speed, a yaw rate, or a steering angle of the host vehicle.

The controller may determine whether the object enters the traveling path of the host vehicle and the collision with the object is predicted.

In accordance with another aspect of the present disclosure, a driver assistance method includes acquiring image data through a camera having a field of view around a vehicle, acquiring radar data through a radar having a sensing area around the vehicle, processing the image data and the radar data, determining whether a collision with a nearby object of the vehicle is predicted in response to the processing of the image data and the radar data when a traveling mode of the vehicle is an autonomous traveling mode, outputting a warning about risk of the collision when the collision with the object is predicted, and controlling at least one of a steering, an acceleration, or a deceleration according to a detected driver's manipulation when detecting the driver's manipulation for at least one of the steering, the acceleration, or the deceleration after outputting the warning.

The outputting of the warning may include outputting a first warning about the risk of the collision when predicting the collision with the object within a predetermined first time.

The driver assistance method may further include determining whether the collision with the object within a second time shorter than the first time is predicted when not detecting a driver's intervention in autonomous traveling after outputting the first warning.

The driver assistance method may further include outputting a second warning about the risk of the collision to the driver when predicting the collision with the object within the second time.

The driver assistance method may further include canceling the autonomous traveling when detecting the driver's manipulation for at least one of the steering, the acceleration, or the deceleration after outputting the second warning.

The driver assistance method may further include controlling at least one of the steering, the acceleration, or the deceleration in order to avoid the collision with the object when not detecting the driver's intervention in the autonomous traveling after outputting the second warning.

The determining of whether the collision with the object is predicted may include identifying the nearby object of the vehicle in response to the processing of the image data.

The determining of whether the collision with the object is predicted may include predicting a dynamic of the object including a longitudinal speed or a transverse speed of the object in response to the processing of the radar data.

The determining of whether the collision with the object is predicted may include predicting a traveling path of a host vehicle based on traveling information on the host vehicle including at least one of a speed, a yaw rate, or a steering angle of the host vehicle.

The determining of whether the collision with the object is predicted may include determining whether the object enters the traveling path of the host vehicle and the collision with the object is predicted.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 4 is a view specifically illustrating a collision prediction module illustrated in FIG. 3;

DETAILED DESCRIPTION

The same reference numbers indicate the same components throughout the specification. The present specification does not describe all elements of embodiments, and general contents or overlapping contents between the embodiments in the technical field to which the disclosure pertains will be omitted. The terms "unit, module, member, and block" used in the specification may be implemented as software or hardware, and according to the embodiments, a plurality of "units, modules, members, and blocks" may be implemented as one component or one "unit, module, member, and block" may also include a plurality of components.

Throughout the specification, when a certain portion is described as being "connected" to another, this includes not only a case of being directly connected thereto but also a case of being indirectly connected thereto, and the indirect connection includes connection through a wireless communication network.

In addition, when a certain portion is described as "including" a certain component, this means further including other components rather than precluding other components unless especially stated otherwise.

Throughout the specification, when a certain member is described as being positioned "on" another, this includes both a case in which the certain member is in contact with another and a case in which other members are present between the two members.

Terms such as first and second are used to distinguish one component from another, and the components are not limited by the above-described terms.

A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Hereinafter, an operation principle and embodiments of the present disclosure will be described with reference to the accompanying drawings.

Figure 1:
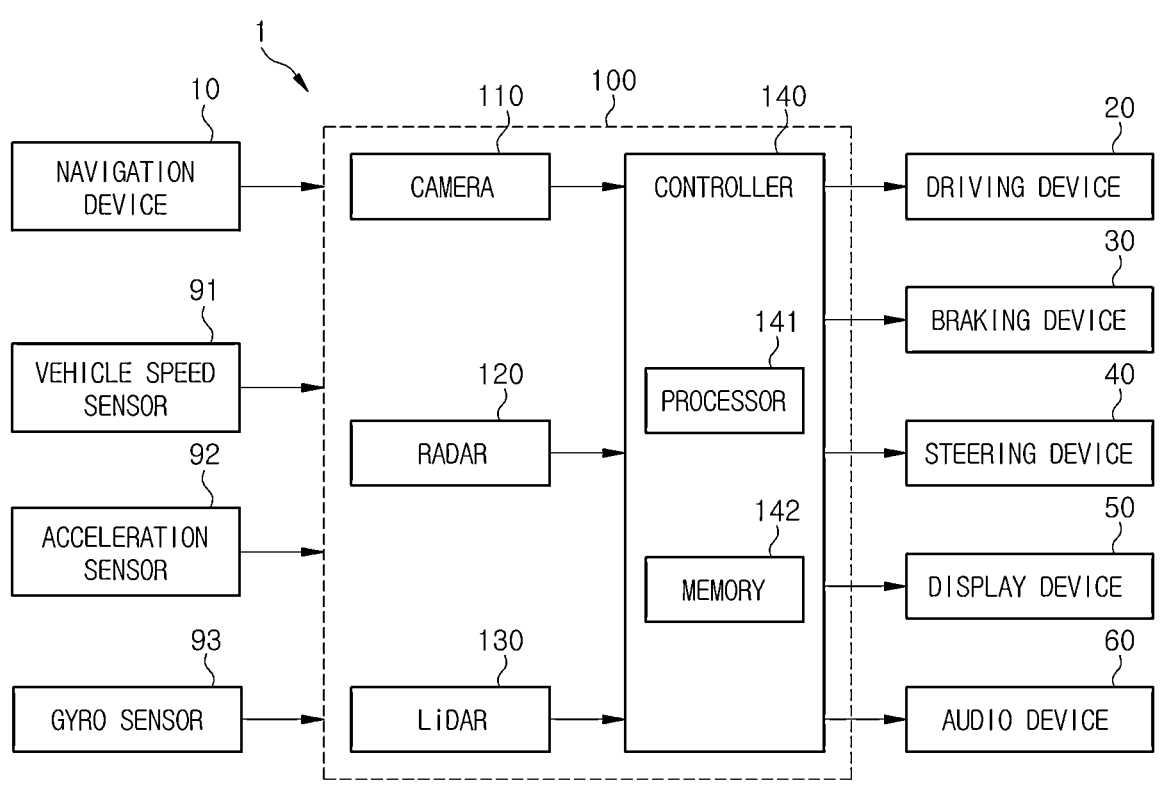
FIG. 1 is a view illustrating configurations of a vehicle and a driver assistance apparatus according to one embodiment.
Figure 2:
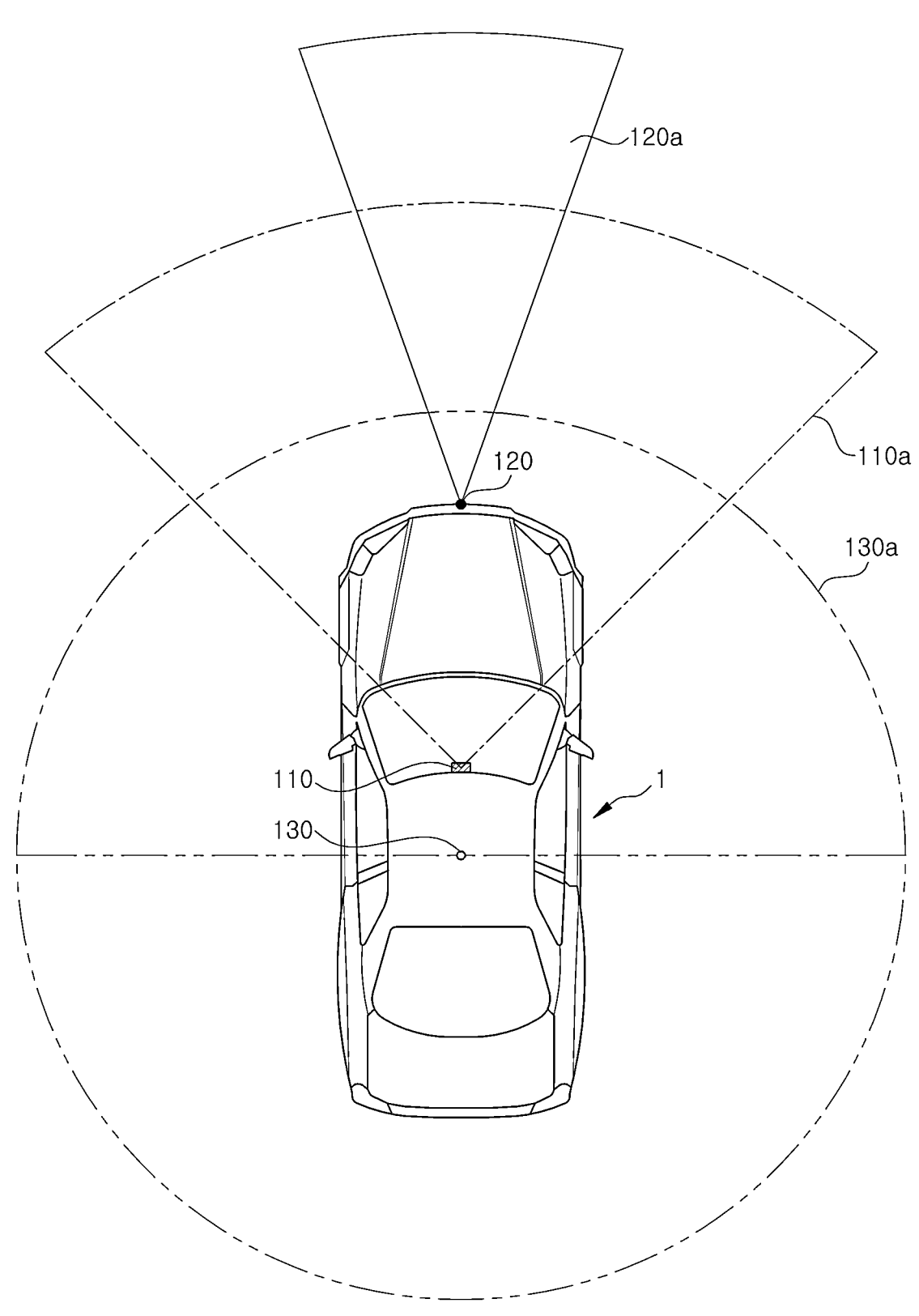
FIG. 2 is a view illustrating fields of view of a camera, a radar, and a light detection and ranging (LiDAR) device included in the driver assistance apparatus according to one embodiment.

FIG. 1 is a view illustrating a configuration of a vehicle according to one embodiment. FIG. 2 is a view illustrating fields of view of a camera, a radar, and a light detection and ranging (LiDAR) device included in the driver assistance apparatus according to one embodiment.

As shown in FIG. 1, a vehicle 1 may include a navigation device 10, a driving device 20, a braking device 30, a steering device 40, a display device 50, an audio device 60, and/or a driver assistance apparatus 100.

In addition, the vehicle 1 may further include sensors 91, 92, and 93 for detecting the dynamic of the vehicle 1. For example, the vehicle 1 may further include a vehicle speed sensor 91 for detecting a longitudinal speed of the vehicle 1, an acceleration sensor 92 for detecting a longitudinal acceleration and a transverse acceleration of the vehicle 1, and/or a gyro sensor 93 for detecting a yaw rate, a roll rate, and a pitch rate of the vehicle 1.

The navigation device 10, the driving device 20, the braking device 30, the steering device 40, the display device 50, the audio device 60, and/or the driver assistance apparatus 100 may communicate with one another via a communication network NT. For example, the electric devices 10, 20, 30, 40, 50, 60, 91, 92, 93, and 100 included in the vehicle 1 may transmit and receive data via Ethernet, media oriented systems transport (MOST), Flexray, controller area network (CAN), local interconnect network (LIN), or the like.

The navigation device 10 may generate a path to a destination input by a driver and provide the generated path to the driver. The navigation device 10 may receive global navigation satellite system (GNSS) signals from a GNSS and identify an absolute position (coordinates) of the vehicle 1 based on the GNSS signals. The navigation device 10 may generate the path to the destination based on the position (coordinates) of the destination input by the driver and a current position (coordinates) of the vehicle 1.

The navigation device 10 may provide map data and position information of the vehicle 1 to the driver assistance apparatus 100. In addition, the navigation device 10 may provide information on the path to the destination to the driver assistance apparatus 100. For example, the navigation device 10 may provide the driver assistance apparatus 100 with information on a distance to an entry ramp for the vehicle 1 to enter a new road, a distance to an exit ramp for the vehicle 1 to exit from the road on which the vehicle 1 currently travels, or the like.

The driving device 20 may move the vehicle 1 and include, for example, an engine, an engine management system (EMS), a transmission, and a transmission control unit (TCU).

The engine may generate power for the vehicle 1 to travel, and the EMS may control the engine in response to a driver's acceleration intention through an accelerator pedal or a request of the driver assistance apparatus 100. The transmission may transmit the power generated by the engine to wheels for deceleration, and the transmission control unit may control the transmission in response to a driver's transmission command through a transmission lever and/or a request of the driver assistance apparatus 100.

The braking device 30 may stop the vehicle 1 and include, for example, a brake caliper and a brake control module (EBCM). The brake caliper may decelerate the vehicle 1 or stop the vehicle 1 using friction with a brake disc, and the EBCM may control the brake caliper in response to the driver's braking intention through a brake pedal and/or a request of the driver assistance apparatus 100. For example, the EBCM may receive a deceleration request including a deceleration from the driver assistance apparatus 100 and electrically or hydraulically control the brake caliper so that the vehicle 1 decelerates depending on the requested deceleration.

The steering device 40 may include an electronic power steering control module (EPS). The steering device 40 may change a traveling direction of the vehicle 1, and the EPS may assist an operation of the steering device 40 so that the driver may easily manipulate a steering wheel in response to the driver's steering intention through the steering wheel.

In addition, the EPS may control the steering device in response to a request of the driver assistance apparatus 100. For example, the EPS may receive a steering request including a steering torque from the driver assistance apparatus 100 and control the steering device to steer the vehicle 1 depending on the requested steering torque.

The display device 50 may include a cluster, a head-up display, a center fascia monitor, and the like and provide various information and entertainment to the driver through images and sounds. For example, the display device 50 may provide traveling information of the vehicle 1, a warning message, and the like to the driver.

The audio device 60 may include a plurality of speakers and provide various information and entertainment to the driver through sounds. For example, the audio device 60 may provide traveling information of the vehicle 1, a warning message, and the like to the driver.

The driver assistance apparatus 100 may communicate with the navigation device 10, the plurality of sensors 91, 92, and 93, the driving device 20, the braking device 30, the steering device 40, the display device 50, and the audio device 60 via a vehicle communication network.

The driver assistance apparatus 100 may receive information on the path to the destination and information on a position of the vehicle 1 from the navigation device 10 and receive information on the vehicle speed, acceleration, and/or angular speed of the vehicle 1 from the plurality of sensors 91, 92, and 93.

The driver assistance apparatus 100 may provide various functions for safety to the driver. For example, the driver assistance apparatus 100 may provide lane departure warning (LDW), lane keeping assist (LKA), high beam assist (HBA), autonomous emergency braking (AEB), traffic sign recognition (TSR), adaptive cruise control (ACC), blind spot detection (BSD), etc.

The driver assistance apparatus 100 may include a camera 110, a radar 120, a LiDAR 130, and a controller 140. The driver assistance apparatus 100 is not limited to that shown in FIG. 1. For example, at least one detector of the camera 110, the radar 120, or the LiDAR 130 is omitted from the driver assistance apparatus 100 shown in FIG. 1, or various detectors capable of detecting nearby objects of the vehicle 1 may be added thereto.

The camera 110, the radar 120, the LiDAR 130, and the controller 140 may be provided separately from each other. For example, the controller 140 may be installed in a housing separated from a housing of the camera 110, a housing of the radar 120, and a housing of the LiDAR 130. The controller 140 may transmit or receive data to or from the camera 110, the radar 120, or the LiDAR 130 through a wide-bandwidth network.

In addition, at least some of the camera 110, the radar 120, the LiDAR 130, or the controller 140 may be integrally provided. For example, the camera 110 and the controller 140 may be provided in one housing, the radar 120 and the controller 140 may be provided in one housing, or the LiDAR 130 and the controller 140 may be provided in one housing.

The camera 110 may capture surroundings of the vehicle 1 and acquire image data of the surroundings of the vehicle 1. For example, the camera 110 may be installed on a front windshield of the vehicle 1 as shown in FIG. 2 and may have a sensing area 110a facing the front of the vehicle 1.

The camera 110 may include a plurality of lenses and an image sensor. The image sensor may include a plurality of photodiodes for converting light into electrical signals, and the plurality of photodiodes may be disposed in the form of a two-dimensional matrix.

The image data may include information on other vehicles, pedestrians, cyclists, or lane lines (markers for distinguishing lanes) positioned around the vehicle 1.

The driver assistance apparatus 100 may include an image processor for processing the image data of the camera 110, and the image processor may be, for example, provided integrally with the camera 110 or integrally with the controller 140.

The image processor may acquire image data from an image sensor of the camera 110 and detect and identify nearby objects of the vehicle 1 based on the processing of the image data. For example, the image processor may use image processing to identify whether an object around the vehicle 1 is another vehicle, pedestrian, cyclist, or the like.

The image processor may transmit information on the identified object around the vehicle 1 to the controller 140.

The radar 120 may transmit transmission radio waves toward the surroundings of the vehicle 1 and detect nearby objects of the vehicle 1 based on reflected radio waves reflected from the nearby objects. For example, the radar

120 may be installed on a grille or bumper of the vehicle 1 as shown in FIG. 2 and may have a sensing area 120a facing the front of the vehicle 1.

The radar 120 may include a transmission antenna (or a transmission antenna array) for radiating transmission radio waves toward the surroundings of the vehicle 1 and a reception antenna (or a reception antenna array) for receiving reflected radio waves reflected from objects.

The radar 120 may acquire radar data from the transmission radio waves transmitted by the transmission antenna and the reflected radio waves received by the reception antenna. The radar data may include position information (e.g., distance information) and/or speed information of objects positioned in front of the vehicle 1.

The driver assistance apparatus 100 may include a signal processor for processing the radar data of the radar 120, and the signal processor may be, for example, provided integrally with the radar 120 or integrally with the controller 140.

The signal processor may acquire the radar data from the reception antenna of the radar 120 and generate data on the dynamic of the object by clustering reflection points of the reflected signal.

The signal processor may, for example, acquire a distance to the object based on a time difference between a transmission time point of the transmission radio wave and a reception time point of the reflected radio wave and acquire a speed of the object based on a difference between a frequency of the transmission radio wave and a frequency of the reflected radio wave.

The signal processor may transmit data on the dynamic of the nearby object of the vehicle 1 acquired from the radar data to the controller 140.

The LiDAR 130 may emit light (e.g., infrared rays) toward the surroundings of the vehicle 1 and detect nearby objects of the vehicle 1 based on reflected light reflected from the nearby objects. For example, the LiDAR 130 may be installed on a roof of the vehicle 1 as shown in FIG. 2 and may have fields of view 130a in all directions around the vehicle 1.

The LiDAR 130 may include a light source (e.g., a light emitting diode, a light emitting diode array, a laser diode, or a laser diode array) for emit light (e.g., infrared rays) and an optical sensor (e.g., a photodiode or a photodiode array) for receiving light (e.g., infrared rays). In addition, as necessary, the LiDAR 130 may further include a driving device for rotating the light source and/or the optical sensor.

While the light source and/or the optical sensor rotates, the LiDAR 130 may emit light through the light source and receive the light reflected from objects through the optical sensor, thereby acquiring LiDAR data.

The LiDAR data may include relative positions (distances and/or directions of nearby objects) and/or relative speeds of the nearby objects of the vehicle 1.

The driver assistance apparatus 100 may include a signal processor capable of processing the LiDAR data of the LiDAR 130, and the signal processor may be, for example, provided integrally with the LiDAR 130 or integrally with the controller 140.

The signal processor may generate data on the dynamic of the object by clustering the reflection points by the reflected light. The signal processor may, for example, acquire a distance to the object based on a time difference between a light transmission time point and a light reception time point. In addition, the signal processor may acquire a direction (or an angle) of the object with respect to a traveling direction of the vehicle 1 based on a direction in which the light source emits light when the optical sensor receives the reflected light.

The signal processor may transmit data on the dynamic of the nearby object of the vehicle 1 acquired from the LiDAR data to the controller 140.

The controller 140 may be electrically connected to the camera 110, the radar 120, and/or the LiDAR 130. In addition, the controller 140 may be connected to the navigation device 10, the driving device 20, the braking device 30, the steering device 40, the display device 50, the audio device 60, and/or the plurality of sensors 91, 92, and 93 via the vehicle communication network NT.

The controller 140 may process the image data of the camera 110, the radar data of the radar 120, and/or the LiDAR data of the LiDAR 130 and provide control signals to the driving device 20, the braking device 30, and/or the steering device 40.

The controller 140 may include a processor 141 and a memory 142.

The memory 142 may store programs and/or data for processing the image data, the radar data, and/or the LiDAR data. In addition, the memory 142 may store programs and/or data for generating driving/braking/steering signals.

The memory 142 may temporarily store the image data received from the camera 110, the radar data received from the radar 120, and the LiDAR data received from the LiDAR 130 and temporarily store the processing results of the image data, the radar data, and/or the LiDAR data of the processor 141.

In addition, the memory 142 may include a high definition (HD) map. Unlike general maps, the HD map may include detailed information on surfaces of roads or intersections, such as lane lines, traffic lights, intersections, and traffic signs. In particular, landmarks (e.g., lane lines, traffic lights, intersections, and traffic signs) that vehicles encounters while traveling are implemented three dimensionally on the HD map.

The memory 142 may include not only volatile memories, such as a static random access memory (SRAM) and a dynamic RAM (DRAM) but also non-volatile memories, such as a read only memory (ROM) and an erasable programmable ROM (EPROM).

The processor 141 may process the image data of the camera 110, the radar data of the radar 120, and/or the LiDAR data of the LiDAR 130. For example, the processor 141 may fuse the image data, the radar data, and/or the LiDAR data and output fusion data.

Based on processing the fusion data, the processor 141 may generate a driving signal, a braking signal, and/or a steering signal for controlling the driving device 20, the braking device 30, and/or the steering device 40, respectively. For example, the processor 141 may evaluate risk of a collision between the fusion tracks and the vehicle 1. The processor 141 may predict the collision with the nearby object of the vehicle 1 using the fusion data and control the driving device 20, the braking device 30, and/or the steering device 40 to steer or brake the vehicle 1.

The processor 141 may include the image processor for processing the image data of the camera 110, the signal processor for processing the radar data of the radar 120 and/or the LiDAR data of the LiDAR 130, or a micro control unit (MCU) for generating driving, braking, and steering signals.

As described above, the controller 140 may provide the driving signal, the braking signal, or the steering signal based on the image data of the camera 110, the radar data of the radar 120, or the LiDAR data of the LiDAR 130.

A detailed operation of the driver assistance apparatus 100 will be described in more detail below.

Figure 3:
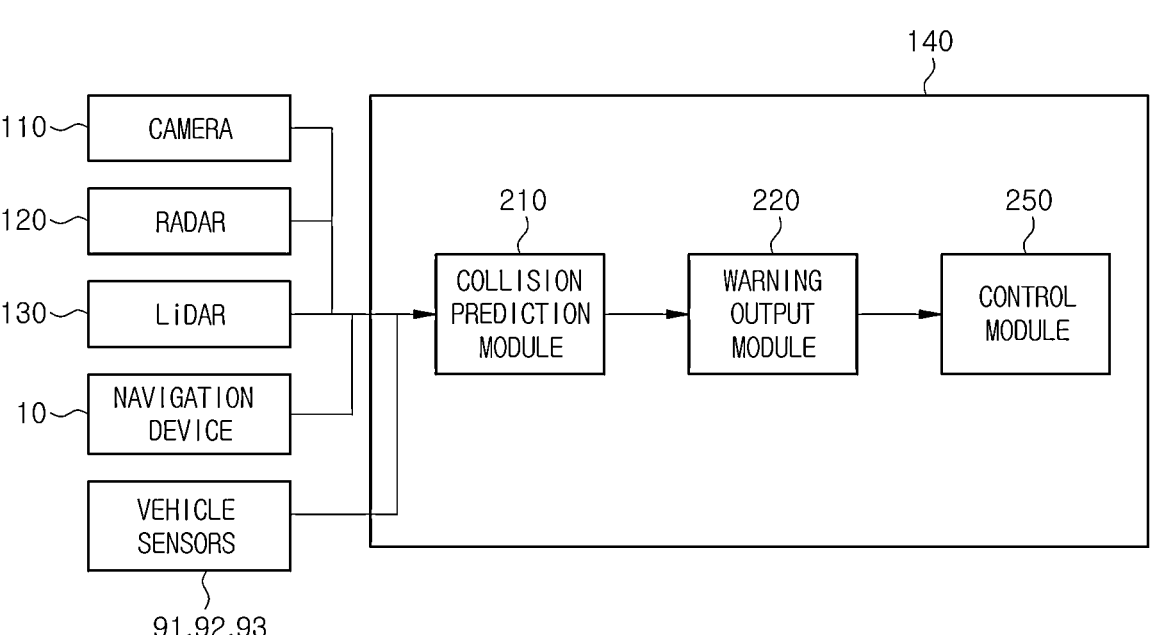
FIG. 3 is a view illustrating functional modules of a controller included in the driver assistance apparatus according to one embodiment.
Figure 4:
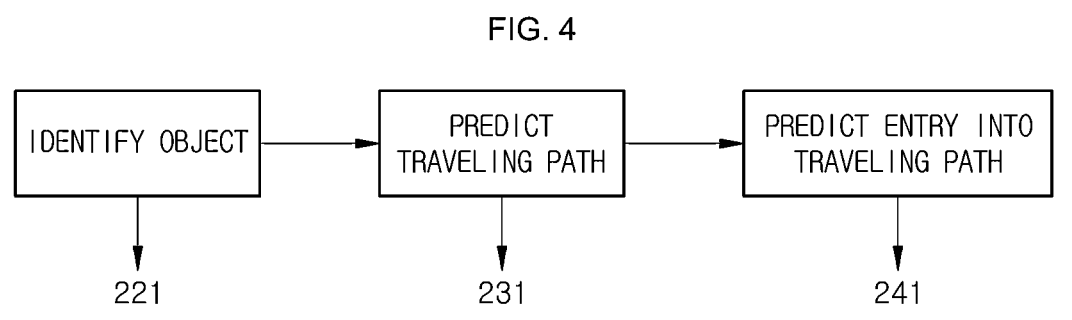
Figure 5:
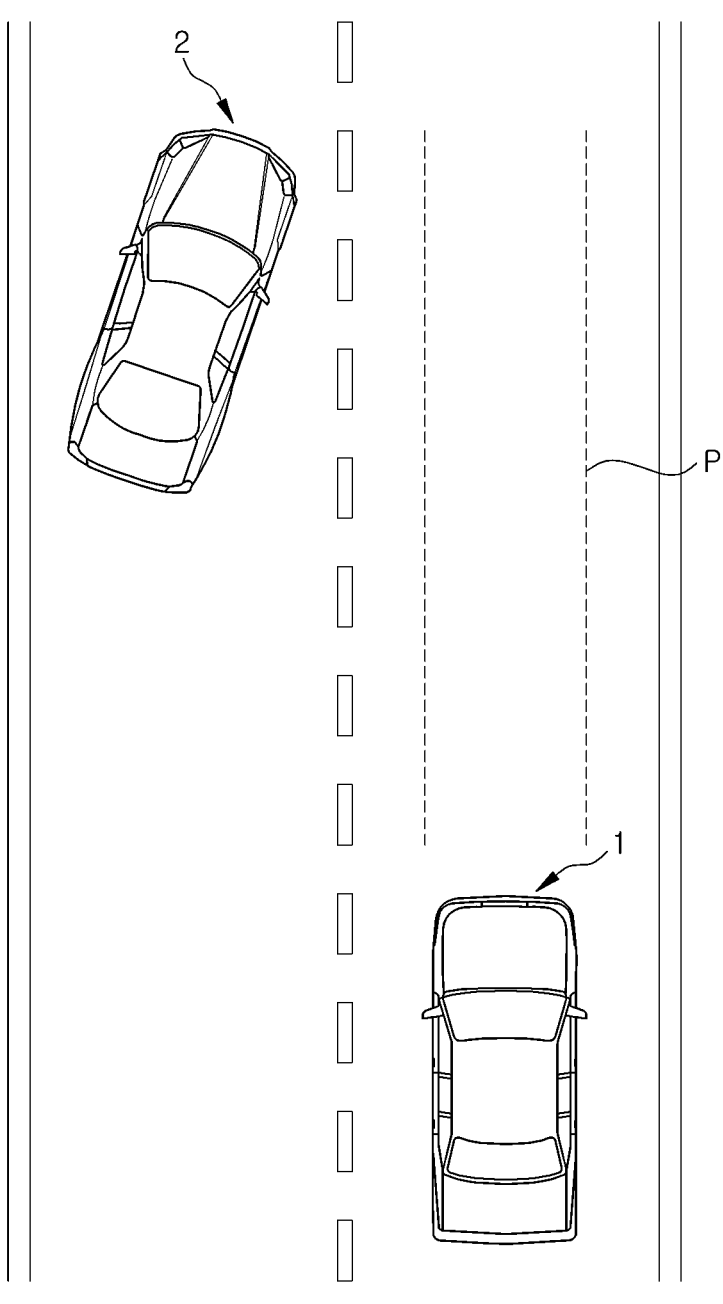
FIG. 5 is a view illustrating a predicted traveling path of a vehicle and a nearby object of the vehicle.
Figure 6:
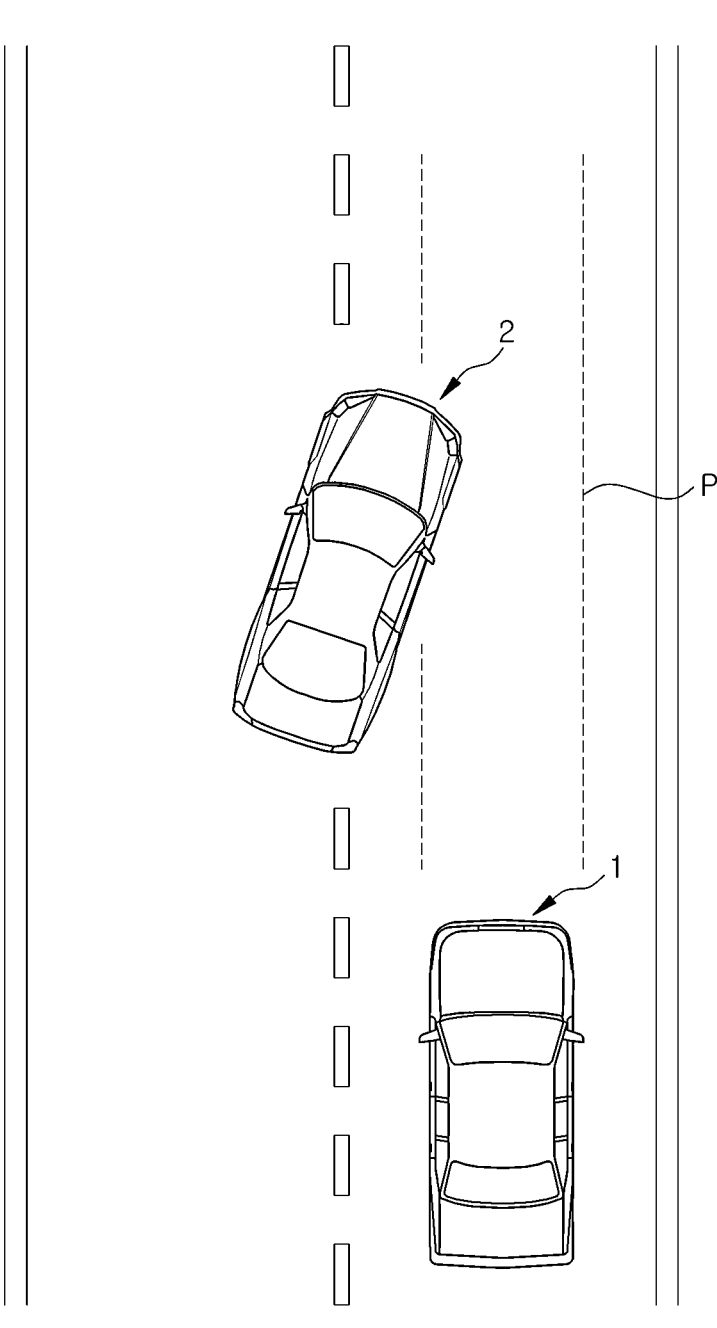
FIG. 6 is a view illustrating the entry of the nearby object of the vehicle into the predicted traveling path of the vehicle.
Figure 7:
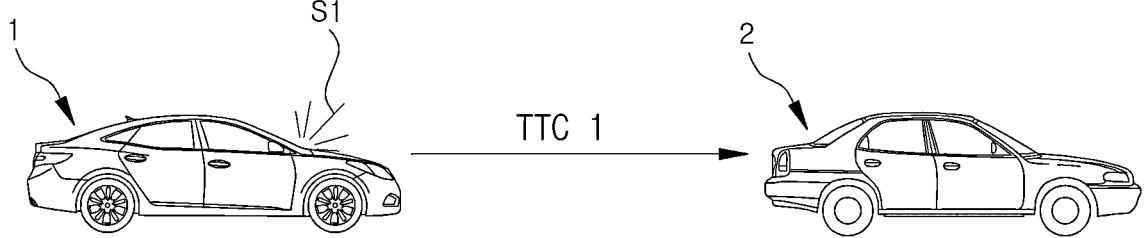
FIGS. 7 and 8 are views illustrating outputting a warning when a collision with an object is predicted.
Figure 8:
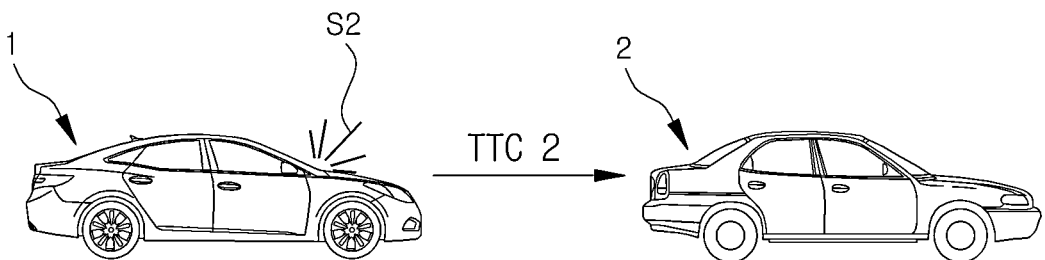

FIG. 3 is a view illustrating functional modules of a controller included in the driver assistance apparatus according to one embodiment. FIG. 4 is a view specifically illustrating a collision prediction module illustrated in FIG. 3. FIG. 5 is a view illustrating a predicted traveling path of a vehicle and a nearby object of the vehicle. FIG. 6 is a view illustrating the entry of the nearby object of the vehicle into the predicted traveling path of the vehicle. FIGS. 7 and 8 are views illustrating outputting a warning when a collision with an object is predicted.

The controller 140 may functionally include a plurality of modules. Each of the modules may be a hardware module (e.g., an application specific integrated circuit (ASIC) or a field programmable gate array (FPGA)) included in the processor 141 or a software module (e.g., an application program or data) stored in the memory 142.

As shown in FIG. 3, the controller 140 may include a collision prediction module 210, a warning output module 220, and a control module 250.

The collision prediction module 210 of the controller 140 may fuse the image data of the camera 110, the radar data of the radar 120, and the LiDAR data of the LiDAR 130 and identify a nearby object 2 of the vehicle 1 (221).

The collision prediction module 210 identifies the object 2 that may cause unexpected risk around the vehicle 1 using the image data of the camera. For example, the collision prediction module 210 may identify whether the object 2 is another vehicle, a pedestrian, a cyclist, a motorcycle, or a guardrail using the image data.

The collision prediction module 210 may classify whether the identified object 2 is the object 2 having a risk factor of a collision with the vehicle 1 through unexpected dynamic. For example, it is possible to identify whether the object 2 may collide with the vehicle 1 based on a distance to the vehicle 1, a speed, a degree of acceleration and deceleration, a direction of the dynamic, or the like.

As shown in FIGS. 5 and 6, when the object 2 having the collision risk with the vehicle 1 among the identified objects is present, the collision prediction module 210 predicts the dynamic of the corresponding object 2, for example, a longitudinal or transverse speed, a traveling direction, or the like of the vehicle using the radar data or the LiDAR data.

In addition, the collision prediction module 210 may acquire data on the speed, yaw rate, steering angle, and the like of the vehicle 1 from the sensors 91, 92, and 93 of the vehicle 1 and predict a traveling path P of the vehicle 1 based on the data (231). In addition, the collision prediction module 210 may also use data on the position of the vehicle 1 provided from the navigation device or the like when predicting the traveling path P of the vehicle 1.

As shown in FIG. 6, the collision prediction module 210 determines whether the object 2 may enter the traveling path P of the vehicle 1 and collide with the vehicle 1 based on the predicted dynamic of the object 2 (241). That is, the collision prediction module 210 determines whether the object 2 will enter the predicted traveling path P of the vehicle 1 and collide with the vehicle 1 within a first time.

More specifically, as shown in FIG. 7, the collision prediction module 210 may calculate a time to collision TTC1 between the vehicle 1 and the object 2 based on a relative speed and a position (distance to) of the object 2 and determine whether a collision with the object 2 is predicted based on a comparison between the TTC1 and a predetermined first time. That is, the collision prediction module 210 may determine whether the collision with the object 2 within the first time, for example, 3 seconds, is predicted. When predicting the collision with the object 2 within the first time, the collision prediction module 210 provides a predicting result to the warning output module 220.

When the collision with the object 2 within the first time is predicted, the warning output module 220 outputs a first warning S1. The warning output module 220 may output a predetermined warning message through a display, a speaker, a steering wheel, a seat belt, a seat, or the like so that a driver may recognize the warning through visual, auditory, and tactile senses.

When the driver's manipulation for driving the vehicle 1 is detected after the first warning is output, the control module 250 follows the driver's manipulation with respect to a factor for which the driver's manipulation has been detected among main factors related to the traveling of the vehicle 1, such as an acceleration, a deceleration, and a steering, according to the detected driver's manipulation.

For example, when the driver attempts deceleration driving by manipulating a brake pedal after the first warning is output, the control module 250 controls the braking device for deceleration corresponding to the driver's manipulation in relation to the speed of the vehicle 1 at which the driver's manipulation has been detected during autonomous traveling. That is, when the driver's manipulation is detected after the first warning is output, the autonomous traveling is not completely canceled, but the control authority of driving the vehicle 1 only with respect to the traveling factor for which the driver's manipulation has been detected is transferred to the driver.

When the driver's manipulation for driving the vehicle 1 is not detected after the first warning is output, the collision prediction module 210 determines whether it is predicted that the object 2 will collide with the vehicle 1 within a second time.

More specifically, as shown in FIG. 8, the collision prediction module 210 may calculate a time to collision TTC2 between the vehicle 1 and the object 2 based on a relative speed and a position (distance to) of the object 2 and determine whether a collision with the object 2 is predicted based on a comparison between the TTC2 and a predetermined second time. That is, the collision prediction module 210 may determine whether the collision with the object 2 within the second time, for example, 1 second, is predicted. When the collision with the object 2 within the second time is predicted, the collision prediction module 210 provides a predicting result to the warning output module 220.

When the collision with the object 2 within the second time is predicted, the warning output module 220 outputs a second warning S2. The warning output module 220 may output a predetermined warning message through a display, a speaker, a steering wheel, a seat belt, a seat, or the like so that a driver may recognize the warning through visual, auditory, and tactile senses.

When outputting the second warning, the warning output module 220 may more strongly output a degree of senses that the driver may recognize, such as visual, auditory, and tactile senses, than the first warning. That is, the warning output module 220 may output a warning message such as a visually brighter and louder warning message, a louder warning message, or a stronger vibration as the second warning.

When the driver's manipulation for driving the vehicle 1 is detected after the second warning is output, the control module 250 cancels autonomous traveling and follows the driver's manipulation for driving the vehicle 1. For example, when the driver attempts deceleration driving by manipulating the brake pedal after the second warning is output, the control module 250 cancels the autonomous driving and follows the driver's manipulation with respect to all factors related to the traveling of the vehicle 1.

That is, unlike the case in which when the driver's manipulation is detected after the first warning is output, where only the control authority of driving the vehicle 1 only with respect to the traveling factors for which the driver's manipulation has been detected is transferred to the driver, when the driver's manipulation is detected after the first warning is output, the autonomous traveling is not completely canceled, but the control authority of driving the vehicle 1 only with respect to the traveling factor for which the driver's manipulation has been detected is transferred to the driver.

When the driver's manipulation is not detected even after the second warning is output, the control module 250 processes the image data, the radar data, the LiDAR data, and the data received from various sensors 91, 92, and 93 of the vehicle 1 and controls the traveling of the vehicle 1, such as an acceleration, deceleration, or steering of the vehicle 1, in order to avoid the collision with the object 2.

Figure 9:
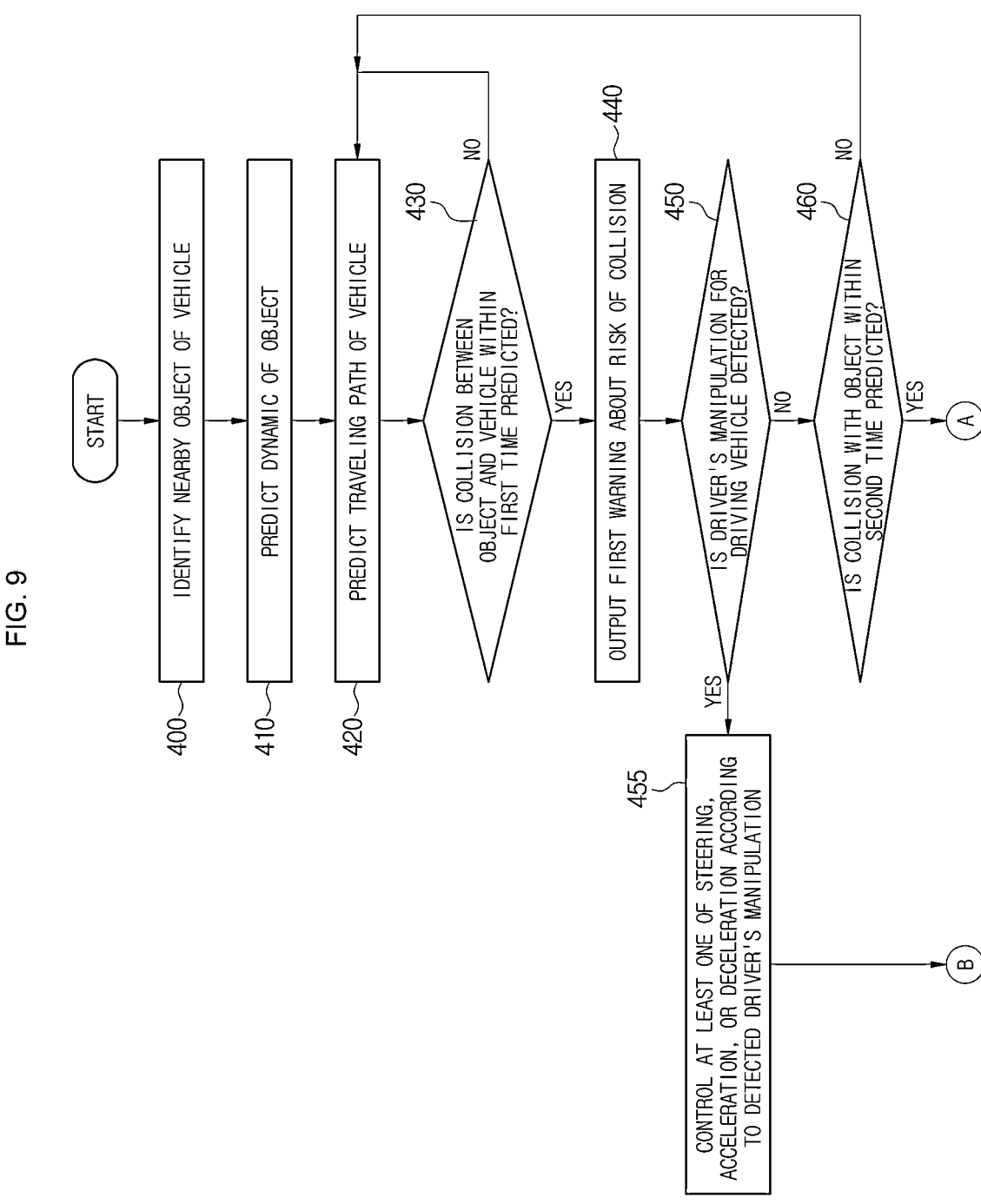
FIGS. 9 and 10 are views for describing an operation of the driver assistance apparatus according to the embodiment.
Figure 10:
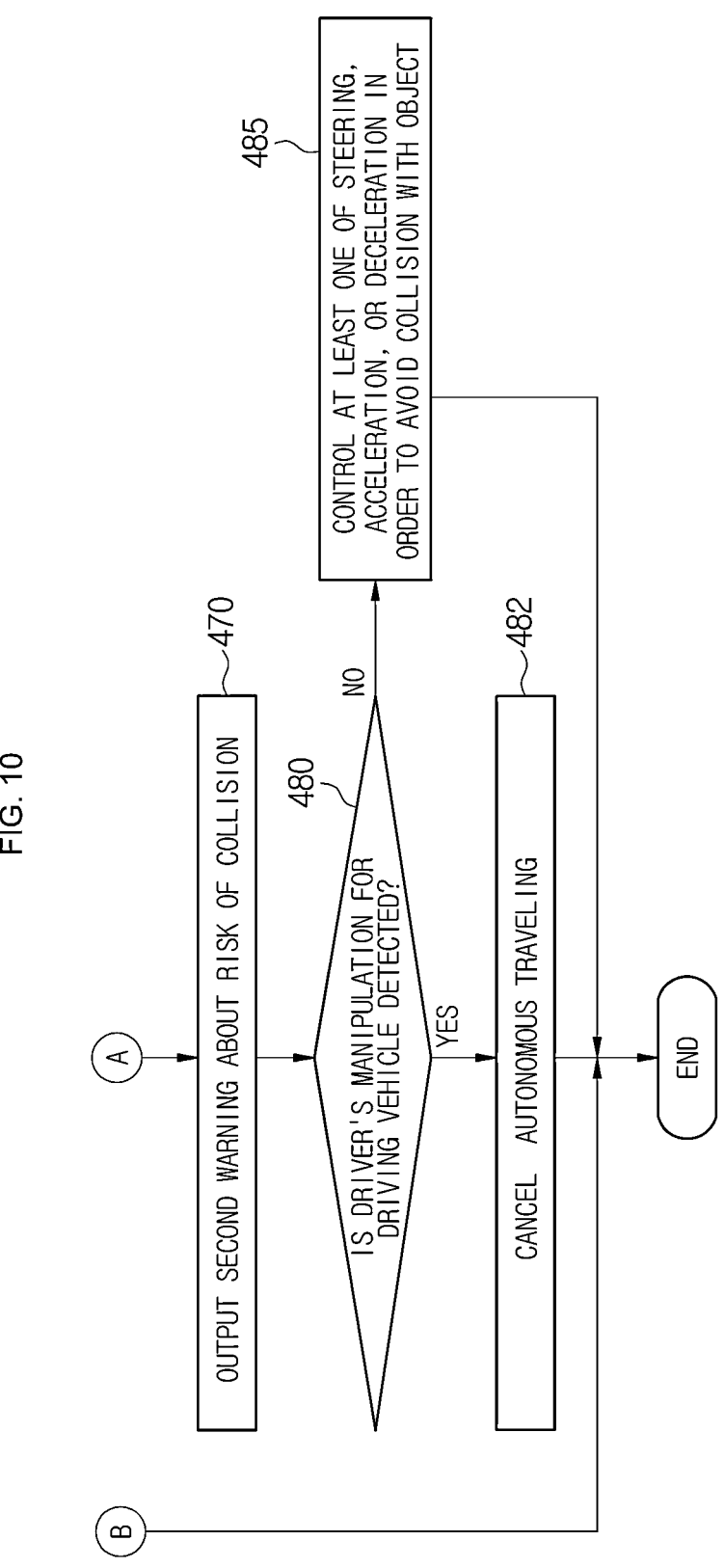

FIGS. 9 and 10 are views for describing an operation of the driver assistance apparatus according to the embodiment.

Referring to FIGS. 9 and 10, the controller 140 may fuse the image data of the camera 110, the radar data of the radar 120, and the LiDAR data of the LiDAR 130 and identify the nearby object 2 of the vehicle 1 (400).

The controller 140 identifies the object 2 that may cause unexpected risk around the vehicle 1 using the image data of the camera. For example, the controller 140 may identify whether the object 2 is another vehicle, a pedestrian, a cyclist, a motorcycle, a guardrail, or the like using the image data.

The controller 140 may classify whether the identified object 2 is an object 2 having a risk factor of a collision with the vehicle 1 through an unexpected dynamic. For example, it is possible to identify whether the object 2 may collide with the vehicle 1 based on a distance to the vehicle 1, a speed, a degree of acceleration and deceleration, a direction of the dynamic, or the like.

As shown in FIGS. 5 and 6, when there is the object 2 with the risk of the collision with the vehicle 1 among the identified objects 2, the controller 140 predicts a dynamic of the corresponding object 2, such as longitudinal and transverse speeds or a traveling direction of a vehicle, using the radar data or the LiDAR data (410).

In addition, the controller 140 may acquire data on the speed, yaw rate, steering angle, and the like of the vehicle 1 from the sensors 91, 92, and 93 of the vehicle 1 and predict the traveling path P of the vehicle 1 based on the data (420). In addition, the controller 140 may also use data on the position of the vehicle 1 provided from the navigation device when predicting the traveling path P of the vehicle 1.

As shown in FIG. 6, the controller 140 determines whether the object 2 may enter the traveling path P of the vehicle 1 and collide with the vehicle 1 based on the predicted dynamic of the object 2. That is, the controller 140 determines whether it is predicted that the object 2 will enter the predicted traveling path P of the vehicle 1 and collide with the vehicle 1 within the first time (430).

More specifically, as shown in FIG. 7, the controller 140 may calculate the time to collision TTC1 between the vehicle 1 and the object 2 based on the relative speed and the position (distance to) of the object 2 and determine whether the collision with the object 2 is predicted based on the comparison between the TTC1 and the predetermined first time. That is, the controller 140 may determine whether the collision with the object 2 within the first time, for example, 3 seconds, is predicted.

When the collision with the object 2 within the first time is predicted, the controller 140 outputs the first warning S1 (440). The controller 140 may output the predetermined warning message through the display, the speaker, the steering wheel, the seat belt, the seat, or the like so that the driver may recognize the warning through visual, auditory, and tactile senses.

When detecting the driver's manipulation for driving the vehicle 1 after outputting the first warning (450), the controller 140 follows the driver's manipulation with respect to the factor for which the driver's manipulation has been detected among the main factors related to the traveling of the vehicle 1, such as an acceleration, a deceleration, and a steering, according to the detected driver's manipulation (455).

For example, when the driver attempts deceleration driving by manipulating the brake pedal after the first warning is output, the controller 140 controls the braking device for deceleration corresponding to the driver's manipulation in relation to the speed of the vehicle 1 at which the driver's manipulation has been detected during autonomous traveling.

That is, after the first warning is output, when the driver's manipulation is detected, the autonomous traveling is not completely canceled, but the control authority of driving the vehicle 1 only with respect to the traveling factor for which the driver's manipulation has been detected is transferred to the driver.

When not detecting the driver's manipulation for driving the vehicle 1 after outputting the first warning, the controller 140 determines whether it is predicted that the object 2 will collide with the vehicle 1 within the second time (460).

More specifically, as shown in FIG. 8, the controller 140 may calculate the time to collision TTC2 between the vehicle 1 and the object 2 based on the relative speed and the position (distance to) of the object 2 and determine whether the collision with the object 2 is predicted based on the comparison between the TTC2 and the predetermined second time. That is, the controller 140 may determine whether the collision with the object 2 within the second time, for example, 1 second, is predicted.

When the collision with the object 2 within the second time is predicted, the controller 140 outputs the second warning S2 (470). The controller 140 may output the predetermined warning message through the display, the speaker, the steering wheel, the seat belt, the seat, or the like so that the driver may recognize the warning through visual, auditory, and tactile senses.

That is, when outputting the second warning, the controller 140 may more strongly output the degree of senses that the driver may recognize, such as visual, auditory, and tactile senses, than the first warning. That is, the controller 140 may output the warning message such as a visually brighter and louder warning message, a louder warning message, or a stronger vibration as the second warning.

When detecting the driver's manipulation for driving the vehicle 1 after outputting the second warning (480), the controller 140 cancels autonomous traveling and follows the driver's manipulation for driving the vehicle 1 (482). For example, when the driver attempts deceleration driving by manipulating the brake pedal after the second warning is output, the controller 140 cancels the autonomous driving and follows the driver's manipulation with respect to all factors related to the traveling of the vehicle 1.

That is, unlike the case in which after the first warning is output, when the driver's manipulation is detected, the control authority of driving the vehicle 1 only with respect to the traveling factors for which the driver's manipulation has been detected is transferred to the driver, after the second warning is output, when the driver's manipulation is detected, the vehicle 1 may be operated according to the driver's intention by canceling the autonomous traveling and transferring the control authority of driving the vehicle 1 to the driver.

When not detecting the driver's manipulation even after outputting the second warning, the controller 140 processes the image data, the radar data, the LIDAR data, and the data received from various sensors 91, 92, and 93 of the vehicle 1 and controls the traveling of the vehicle 1, such as an acceleration, deceleration, or steering of the vehicle 1, in order to avoid the collision with the object 2 (485).

As described above, the driver assistance apparatus according to the disclosed embodiments can detect unexpected risk factors in advance and transmit many pieces of information to a driver so that the driver can keep an eye on the risk factors at all times and immediately intervene. In addition, since the driver determines the determination about potential risk factors, it is possible to reduce risk due to incorrect determination of autonomous traveling. In addition, it is possible to give a driver confidence in terms of the safety of autonomous traveling vehicles by actively notifying the driver of risk factors having a collision possibility.

Meanwhile, the disclosed embodiments may be implemented in the form of a recording medium in which instructions executable by a computer are stored. The instructions may be stored in the form of program codes, and when executed by a processor, program modules are generated to perform operations of the disclosed embodiments. The recording medium may be implemented as a computer-readable recording medium.

The computer-readable recording media include any type of recording media in which instructions that can be decoded by a computer are stored. For example, there may be a read only memory (ROM), a random access memory (RAM), a magnetic tape, a magnetic disk, a flash memory, an optical data storage device, etc.

A device-readable storage medium may be provided in the form of a non-transitory storage medium. Here, "non-transitory storage medium" is a tangible device and only means not including a signal (e.g., electromagnetic waves), and this term does not distinguish between cases in which data is stored semi-permanently and temporarily in the storage medium. For example, "non-temporary storage medium" may include a buffer in which data is temporarily stored.

As is apparent from the above description, it is possible to detect unexpected risk factors in advance and transmit many pieces of information to a driver so that the driver can keep an eye on the risk factors at all times and immediately intervene.

In addition, since people determine the determination about potential risk factors, it is possible to reduce risk due to incorrect determination of autonomous traveling.

As described above, the disclosed embodiments have been described with reference to the accompanying drawings. Those skilled in the art to which the present disclosure pertains will understand that the present disclosure can be carried out in the form different from those of the disclosed embodiments even without changing the technical spirit or essential features of the present disclosure. The disclosed embodiments are illustrative and should not be construed as being limited.

What is claimed is:

1. A driver assistance apparatus comprising:
   a processor configured to process image data acquired from a camera having a field of view around a vehicle, and radar data acquired from a radar having a sensing area around the vehicle, and
   a memory configured to store programs for processing the image data and the radar data, wherein the processor is configured to:
   determine whether a collision with an object around the vehicle is predicted in response to processing the image data and the radar data when a traveling mode of the vehicle is an autonomous traveling mode;
   output a first warning about risk of the collision when the collision with the object within a predetermined first time is predicted;
   when a driver's intervention in the autonomous traveling is not detected after outputting the first warning, determine whether the collision with the object within a second time shorter than the first time is predicted;
   when the collision with the object within the second time is predicted, output a second warning about the risk of the collision to the driver; and
   control at least one of a steering, an acceleration, or a deceleration according to a detected driver's manipulation and cancel the autonomous traveling when detecting the driver's manipulation for at least one of the steering, the acceleration, or the deceleration after outputting the second warning.

2. The driver assistance apparatus of claim 1, wherein, when not detecting the driver's intervention in the autonomous traveling after outputting the second warning, the processor controls at least one of the steering, the acceleration, or the deceleration in order to avoid the collision with the object.

3. The driver assistance apparatus of claim 1, wherein the processor identifies the object around the vehicle in response to the processing of the image data.

4. The driver assistance apparatus of claim 1, wherein the processor predicts a dynamic of the object including a longitudinal speed or a transverse speed of the object in response to the processing of the radar data.

5. The driver assistance apparatus of claim 1, wherein the processor predicts a traveling path of the vehicle based on traveling information on the vehicle including at least one of a speed, a yaw rate, or a steering angle of the vehicle.

6. The driver assistance apparatus of claim 5, wherein the processor determines whether the object enters the traveling path of the vehicle and the collision with the object is predicted.

7. A driver assistance method comprising:
   acquiring image data through a camera having a field of view around a vehicle;
   acquiring radar data through a radar having a sensing area around the vehicle;
   processing the image data and the radar data;
   determining whether a collision with an object around the vehicle is predicted in response to the processing of the image data and the radar data when a traveling mode of the vehicle is an autonomous traveling mode;
   outputting a first warning about risk of the collision when the collision with the object within a predetermined first time is predicted;

when a driver's intervention in the autonomous traveling is not detected after outputting the first warning, determining whether the collision with the object within a second time shorter than the first time is predicted;

when the collision with the object within the second time is predicted, outputting a second warning about the risk of the collision to the driver; and controlling at least one of a steering, an acceleration, or a deceleration according to a detected driver's manipulation and canceling the autonomous traveling when detecting the driver's manipulation for at least one of the steering, the acceleration, or the deceleration after outputting the second warning.

8. The driver assistance method of claim 7, further comprising controlling at least one of the steering, the acceleration, or the deceleration in order to avoid the collision with the object when not detecting the driver's intervention in the autonomous traveling after outputting the second warning.

9. The driver assistance method of claim 7, wherein the determining of whether the collision with the object is predicted includes identifying the object around the vehicle in response to the processing of the image data.

10. The driver assistance method of claim 7, wherein the determining of whether the collision with the object is predicted includes predicting a dynamic of the object including a longitudinal speed or a transverse speed of the object in response to the processing of the radar data.

11. The driver assistance method of claim 7, wherein the determining of whether the collision with the object is predicted includes predicting a traveling path of the vehicle based on traveling information on the vehicle including at least one of a speed, a yaw rate, or a steering angle of the vehicle.

12. The driver assistance method of claim 11, wherein the determining of whether the collision with the object is predicted includes determining whether the object enters the traveling path of the vehicle and the collision with the object is predicted.

* * * * *